United States Patent [19]

Gillis et al.

[11] Patent Number: 5,353,341
[45] Date of Patent: Oct. 4, 1994

[54] CORDLESS TELEPHONE ARRANGED FOR OPERATION IN A FREQUENCY HOPPING SYSTEM

[75] Inventors: Mark E. Gillis, Eatontown; Kenneth W. Leland, Toms River; William J. Nealon, Ocean Grove; Hon Yu, Aberdeen, all of N.J.

[73] Assignee: AT&T Bell Laboratories, Murray Hill, N.J.

[21] Appl. No.: 779,754

[22] Filed: Oct. 21, 1991

[51] Int. Cl.⁵ .................................. H04M 11/00
[52] U.S. Cl. ..................................... 379/61; 379/62; 455/38.3; 455/34.1; 375/1
[58] Field of Search .................. 379/58, 61, 62, 60; 455/34.1, 34.2, 38.3, 54.1, 71, 88, 127, 161.1, 161.2, 164.1, 166.1, 166.2, 343; 370/95.1, 100.1, 105.1; 375/1

[56] References Cited

U.S. PATENT DOCUMENTS

| | | | |
|---|---|---|---|
| 4,554,668 | 11/1985 | Deman et al. | 375/1 |
| 4,558,453 | 12/1985 | Mimken | 375/1 |
| 4,631,496 | 12/1986 | Borras et al. | 455/343 |
| 4,731,814 | 3/1988 | Becker et al. | 379/62 |
| 4,850,036 | 7/1989 | Smith | 375/1 |
| 5,077,753 | 12/1991 | Grau, Jr. et al. | 375/1 |
| 5,133,002 | 7/1992 | Kikuchi et al. | 379/58 |

FOREIGN PATENT DOCUMENTS 0189920 8/1986 European Pat. Off. .............. 379/60
0248351 12/1987 European Pat. Off. .............. 379/61

OTHER PUBLICATIONS

IEEE Communications Magazine article "Spread Spectrum for Commercial Communications", Schilling et al., Apr. 1991, pp. 66–79.

Primary Examiner—Curtis Kuntz
Assistant Examiner—Dwayne D. Bost
Attorney, Agent, or Firm—Samuel R. Williamson

[57] ABSTRACT

A cordless telephone arranged for operation in a frequency hopping system conserves battery power in a handset unit when this unit is located remote from an associated base unit and in a standby state. While in this standby state, the handset unit resides in a low power monitoring mode and monitors a channel pseudo-randomly selected from a plurality of available channels in the frequency hopping band for receipt of an initialization signal from the associated base unit. The base unit similarly monitors this selected one of the channels for receipt of this initialization signal from the handset unit. Should ongoing communications between the base unit and the handset unit be inadvertently interrupted, the cordless telephone quickly re-establishes communications in the frequency hopping system through an initialization process executed by both the handset unit and the base unit.

15 Claims, 5 Drawing Sheets

FIG. 5
HOP MESSAGE TRANSMISSION FORMAT

CORDLESS TELEPHONE ARRANGED FOR OPERATION IN A FREQUENCY HOPPING SYSTEM

BACKGROUND OF THE INVENTION

1. Technical Field

This invention relates to cordless telephones and more particularly to a method and apparatus employed in a cordless telephone for providing increased functionality and for extending the useful battery life of such telephone.

2. Description of the Prior Art

A typical cordless telephone system includes a handset or remote unit and a base unit. The base unit is connected to the telephone lines and includes an antenna, a transmitter and a receiver for communicating a radio frequency carrier signal that is modulated by switching signals and audio signals to and from the handset unit as appropriate. Power for operation of the base unit is obtained from local line power. The handset unit includes a speaker and a microphone, and also an antenna, a transmitter and a receiver for likewise communicating telephone switching signals and audio signals to and from the base unit. Power for operation of the handset unit is obtained from a battery contained therein. This battery is usually charged by the local line power when the handset unit is placed in a cradle located in the base unit.

In the operation of a typical cordless telephone handset unit in originating and receiving a call, the receiver of the handset unit normally remains in an on-condition whenever the handset unit is removed from the base unit. If a user desires to place a call from the handset unit, the transmitter in the handset unit generates a control signal that is transmitted to the base unit. Upon receipt and detection of the control signal, the base unit seizes the telephone lines so as to enable audio signals and switching signals from the handset unit that are received by the base unit within a given audio frequency band to be passed onto the telephone lines. If an incoming telephone ringing signal is sensed by the base unit, reflecting an incoming call, the base unit, in turn, transmits this ringing signal to the handset unit where it is detected by the handset unit receiver which activates a ringer in the handset unit.

High battery drain current limits the period of time for reliable operation of handset units while located remote from associated base units. In order to extend this time and yet insure reliable operation for an extended period, one specific arrangement disclosed in U.S. Pat. No. 4,731,814 and issued to W. R. Becker et al. on Mar. 15, 1988, reduces the battery drain current in the handset unit when the telephone is not in use and the handset unit is on-hook, i.e., no telephone call is in progress. Operation of the handset unit is through a process wherein power to the transmitter in the handset unit is removed and power to the receiver and other selected circuitry in the handset unit is controlled to minimize power consumption when the handset unit is located remote from the base unit and also monitoring for a telephone ring signal from the base unit.

Control of the power to the receiver and the other selected circuitry in the handset unit of the Becker et al. arrangement is achieved by cycling the power to these circuits on and off while the handset unit is in a standby state. And the handset unit only responds to a ringing signal received from the base unit that is accompanied by an identification code that the handset unit recognizes.

While this type of arrangement in a cordless telephone system has been generally satisfactory in the past for those cordless telephones that initiate communications over one of multiple channels and continue to use this same channel for ongoing communications between the handset unit and the base unit, recent rulings promulgated by the Federal Communication Commission in the utilization of spread spectrum systems, including a frequency hopping system, now allow for increased spectral utilization. Frequency hopping systems spread their energy by changing, or hopping the center frequency of the transmission many times a second in accordance with a pseudo randomly generated list of channels. Although ample technical challenges are provided in the design of cordless telephones suitable for operating in these systems, it is nevertheless desirable to provide a cordless telephone that provides the desired functionality, including increased battery life, while operating in a frequency hopping system.

SUMMARY OF THE INVENTION

In accordance with the invention, a cordless telephone arranged for operation in a frequency hopping system provides for conserving battery power in a handset unit when this unit is located remote from an associated base unit and in a standby state. While in the standby state, the handset unit resides in a low power monitoring mode which includes deactivating certain internal circuitry and reducing the on-time state of other internal circuitry for conserving battery power.

In accordance with one feature of the invention, a channel pseudo-randomly selected from a plurality of available channels in the frequency hopping band is used for initiating communications between the base unit and the handset unit whenever the handset unit enters into the standby state. During the time that the handset unit is operating in the low power monitoring mode, the handset unit periodically monitors the pseudo-randomly selected channel for receipt of an initialization signal from the base unit. The base unit similarly monitors this selected one of the channels for receipt of this initialization signal from the handset unit.

In accordance with another feature of the invention, increased functionality is achieved in that the cordless telephone quickly re-establishes communications in the frequency hopping system through an initialization process executed by both the handset unit and the base unit should ongoing communications be inadvertently interrupted.

BRIEF DESCRIPTION OF THE DRAWINGS

The invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
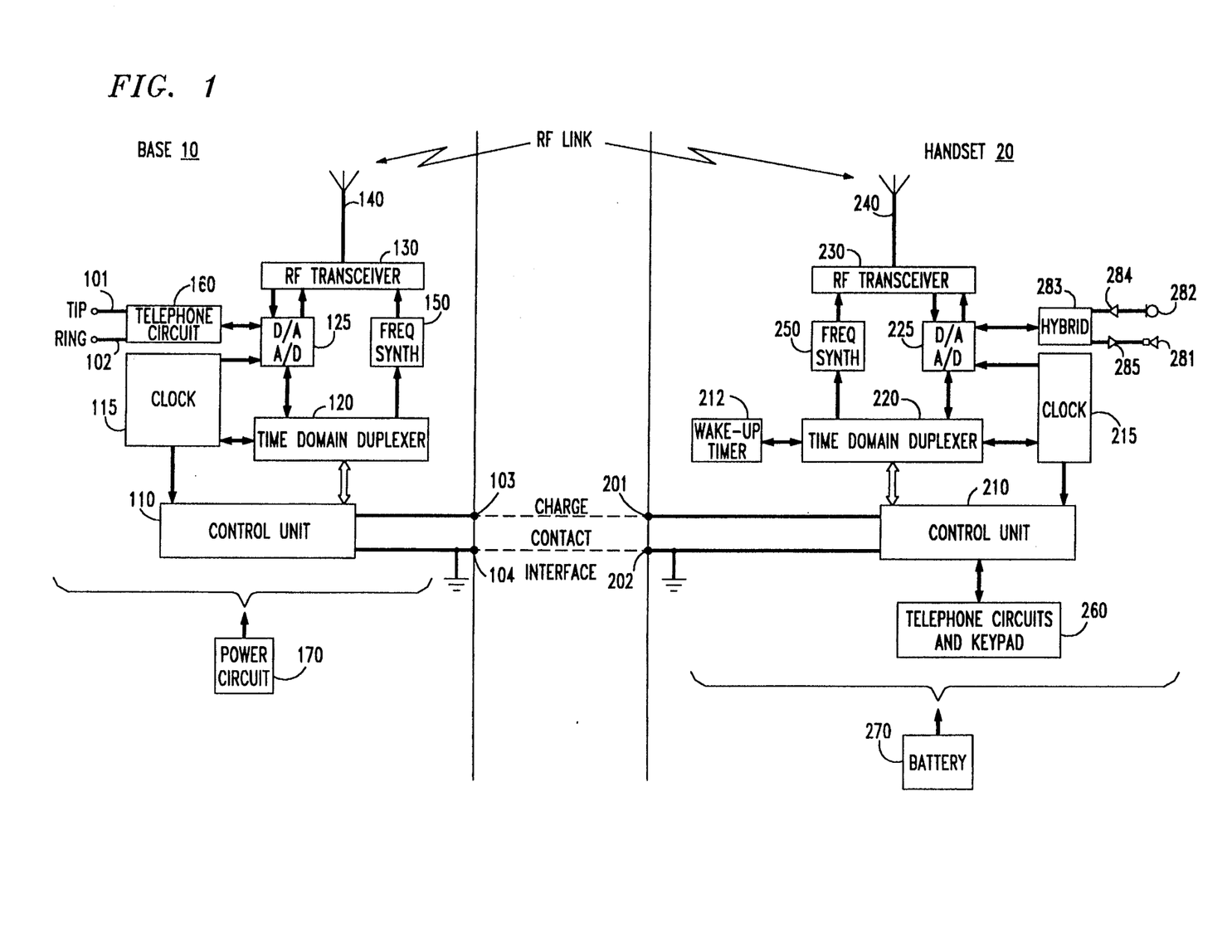
FIG. 1 is a functional block representation of a cordless telephone base unit and handset unit both operative in accordance with the principles of the present invention.

Referring now to FIG. 1 of the drawing, there is shown a general block diagram of certain circuitry of a cordless telephone that provides increased functionality and incorporates a power conserving arrangement for the handset unit operative in accordance with the principles of the present invention. As shown, the cordless telephone generally comprises a base unit 10 and a handset unit 20 which are both operable over a plurality of communication channels in a frequency hopping system.

A general overview of spread spectrum technology including frequency hopping systems is provided by R. C. Dixon, *Spread Spectrum Systems*, New York: John Wiley & Sons, 1984. The specific requirements for the frequency hopping system in which this cordless telephone is designed to operate are set forth in a Report and Order in General Docket No. 89-354, this Report and Order being adopted by the Federal Communications Commission on Jun. 14, 1990 and released on Jul. 9, 1990.

Included in the base unit 10 are a control unit 110, a clock 115 for providing synchronization to: 1) the control unit 110, 2) a time domain duplexer (TDD) 120 and 3) a combined digital-to-analog and analog-to-digital (D/A+A/D) converter 125. Also included in the base unit 10 is a radio frequency (RF) transceiver 130, an antenna 140 and a frequency synthesizer 150. A telephone circuit 160 in the base unit 10 connects this unit to a central office or other appropriate switch through tip and ring lines 101 and 102. The transceiver 130 comprise both a RF transmitter and a RF receiver. The transceiver 130 demodulates voice signals transmitted by the handset unit 20 and couples these signals via the D/A section of converter 125 to the telephone circuit 160. The transceiver 130 also has as its input speech and other control signals from the telephone circuit 160 which are first coupled through the A/D section of converter 125 before being transmitted to the handset unit 20 by this transceiver 130. The telephone circuit 160 serves as a "plain old telephone service" (POTS) interface for signals on the tip-ring lines 101 and 102 and for those signals received from the handset unit 20 by the RF transceiver 130. Finally a power circuit 170 provides operating power for all of the circuitry in the base unit 10.

The control unit 110 advantageously provides a number of control functions and may be implemented through the use of a microcomputer containing read-only-memory (ROM), random-access-memory (RAM) and through use of the proper coding. Such a microcomputer is known in the art and is readily available from semiconductor manufacturers such as Signetics, Intel and AMD.

The control unit 110 generates and stores security code data and also generates a pseudo random data list having, for example, a group of 50 data values which correspond to a set of 50 random channels from 173 possible channels available in the 902–928 MHz frequency band in accordance with the Federal Communication Commission's General Docket No. 89-354. The security code data is generated while the handset unit 20 is in a mating cradle in the base unit 10 and is provided to the handset unit 20 in accordance with the teachings of U.S. Pat. No. 4,736,404 issued to R. E. Anglikowski, et al. on Apr. 5, 1988. The security code data stored in control unit 110 is transmitted between the base unit 10 and the handset unit 20 via a battery charge contact interface formed by contacts 103 and 104 located on the base unit which interface with contacts 201 and 202 located on the handset unit 20. The security code, provided during an initialization process described later herein, is transmitted while establishing initial communications or call set-up during the time that the handset unit 20 is located remote from the base unit 10 as well as during the transfer of subsequent opcode data between these units during ongoing communications.

Like the security code data, the pseudo randomly generated data list is generated when the handset unit 20 is in the mating cradle in the base unit 10. In accordance with the invention, the control unit 110 generates an expanded pseudo random data list including, for example, a 51st and 52nd data value in the group of data values which corresponds to a set of two in the 173 possible channels available in the 902–928 MHz frequency band. Also like the security code data, this set of channels is used during the initialization process described in greater detail later herein. It will become apparent to those skilled in the art that the pseudo randomly generated data list could alternative be implemented in the handset unit 20 without departing from the spirit and scope of this invention. The data list, which includes data for this set of channels, also is transmitted between the base unit 10 and the handset unit 20 via the battery charge contact interface during the initialization process. This pseudo randomly generated data list may be generated in accordance with the teaching of S. W. Golomb in *Digital Communications With Space Applications* (New Jersey: Prentice-Hall 1964) pp. 7–15.

This control unit 110 also controls and configures the TDD 120. The pseudo randomly generated data list from the control unit 110 is provided to the TDD where it is stored therein. The TDD 120, in turn, controls the frequencies selected in the frequency hopping cycle of the base unit 10 by inputting into the frequency synthesizer 150 at the appropriate time the values stored in the data list generated by the control unit 110. The TDD 120 also refreshes the frequency synthesizer 150 as the synthesizer progresses though the frequency hopping cycle.

Referring next to the handset unit 20, components in this unit include a control unit 210, a wake-up timer 212 and a clock 215 for providing synchronization to: 1) the control unit 210, 2) a time domain duplexer (TDD) 220 and 3) a combined digital-to-analog and analog-to-digital (D/A+A/D) converter 225. Also included in the handset unit 20 are a RF transceiver 230, an antenna 240 and a frequency synthesizer 250. A telephone circuits and keypad section 260 permits dialing telephone digits and selecting such functions as talk, intercom and page modes for the handset unit 20 to communicate with the base unit 10. A battery 270 provides operating power for all the circuitry in the handset unit 20. This battery is charged by the power circuit 170 via the charge contact interface 103, 104 and 201, 206 formed when the handset unit 20 is placed in the mating cradle of the base unit 10.

The transceiver 230 comprises both a RF transmitter and a RF receiver. This transceiver 230 demodulates voice signals transmitted by the base unit 10 and couples these signals via the D/A section of converter 225 and a hybrid 283 on to a loudspeaker 281. The transceiver 230 also has as its input analog speech signals from a microphone 282 which it transmits to the base unit 10. These analog speech signals are coupled to the transceiver via the hybrid 283 and the A/D section of converter 225. This converter converts the analog signal to a digital signal which is then provided to the RF transceiver 230. Conventional amplifiers 284 and 285 are employed for respectively amplifying the analog speech signals obtained from the microphone 282 and provided to the loudspeaker 281.

The initialization process that configures the handset unit 20 for communicating with the base unit 10 takes place when the handset unit is placed in the mating cradle of the base unit 10. Included in the telephone circuit and keypad section 260 is an in-cradle detector (not shown) for detecting when the handset unit is inserted in the mating cradle on the base unit. This in-cradle detector also signals the control unit 210 whenever the handset unit 20 is inserted in the cradle. During the initialization process, the control unit 210 interfaces with and communicates with the control unit 110 in the base unit 10. As a part of this communication, the control unit 210 receives the pseudo randomly generated data list and the security code data from the control unit 110 over the charge contact interface 103, 104 and 201, 202. Once this data has been received, the control unit 210 acknowledges receipt of the data by echoing this same data back to the base unit 10 via the charge contact interface.

Any communications between the base unit 10 and the handset unit 20 must be accompanied by the security code then shared between them. During the establishing of initial communications between the handset unit 20 and the base unit 10 initiated by the base unit 10, the control unit 210 must be able to make a favorable comparison of the received security code data with its stored security code data. Similarly, a favorable comparison of the data from the two security codes also must be made by control unit 110 in order for the base unit 10 to respond to a call set-up request from a handset unit. Like the control unit 110, the control unit 210 may be implemented through the use of a microcomputer containing ROM, RAM and through use of the proper coding. Such a microcomputer is known in the art and is readily available from semiconductor manufacturers such as Signetics, Intel and AMD.

While the handset unit 20 is not being used for communications and is located remote from the base unit 10, the handset unit 10 enters a low power monitoring mode which includes powering down and then powering up certain minimum circuitry in the handset unit 20 as necessary for satisfactory operation. Reducing the on-time state of this circuitry aids in conserving battery power when no communications are in progress between the handset unit and the base unit. Also, other circuitry in the handset unit 20 is turned completely off while the handset unit is in this monitoring mode. In powering down the handset 20, the control unit 210 turns itself off or puts itself to sleep and signals the TDD 220 also to turn off while in the powered down state. Before turning off, the TDD 220 activates wake-up timer 212, which comprises, for example a one-shot-monostable-multivibrator, and turns off all other clock-driven circuitry in the handset unit 20. After approximately 360 milliseconds, the handset 20 is powered up into a minimum power operating state for 40 milliseconds. This change of state is initiated by a pulse provided to the TDD 220 from wake-up timer 212 at the end of the 360 milliseconds. The TDD 220 is enabled thereby and, in turn, turns on the control unit 210, the clock 215 and the receiver portion of the transceiver 230 for determining if a RF signal is being transmitted from the base unit or if a key has been pushed on the keypad in the handset unit 20. If neither of these has occurred, the control unit 210 again turns off power to itself and to the TDD 220, and the cycle is repeated. This low power monitoring mode continues as long as an RF signal is not received from the base unit or a key is not pushed on the keypad.

When an RF signal is received from a base unit, this signal is coupled to the control unit 210 which looks for an initialization synchronization (sync) pattern in the signal within the 40 milliseconds that the handset unit is powered up to its minimum power operating state. If the received initialization sync pattern does not contain the security code that is recognized by the handset unit, the control unit 210 turns off power to itself and to the TDD 220. If the initialization sync pattern does contains the security code that is recognized by the handset unit, however, the control unit 210 causes the low power monitoring mode to be overridden. In so doing, the control unit 210 continues to enable the TDD 220 beyond its normal ON time in order to establish synchronization with the RF signal being received from the base unit. The low power monitoring mode of the handset unit 20 also is overridden by certain key pushes on the keypad as well as when the handset unit is placed into the mating cradle in the base unit 10 so that an exchange of data between the handset unit and base unit can take place through the battery charge contact interface then existing there between.

Communications between the base unit and the handset unit occur in time periods designated as transmission frames. In a frame, the base unit and the handset unit both transmit to each other. A typical transmission frame may be, for example, 5 milliseconds in length and contain time slots for approximately 500 bits of information. In operation, the base unit generally transmits in the first half of each frame or for 2.5 milliseconds and is then reconfigured to receive a signal from the handset unit which transmits in the second half of each frame or for 2.5 milliseconds on the same frequency. The handset unit operates in complementary fashion to the base unit in that it receives in the first half of each frame and is reconfigured to transmit in the second half of each frame. This cyclic frame transmission generates 80 frames in approximately 400 milliseconds.

Both the base unit and the handset unit may initiate a call to each other. As earlier indicated, channels 50 and 51 are the set of channels used for initiating communications between the base and handset units. When the base unit is initiating a call to the handset unit, the base unit sends the initialization synchronization pattern on channel 51 in the first part of each frame for 400 milliseconds. When the handset unit is initiating a call to the base unit, the handset unit also sends this same initialization synchronization pattern on channel 51 but in time periods equal to the second part of each frame for 120 milliseconds. This synchronization pattern comprises a dotting sequence signal, followed by a security code, a barker code and a period in which no information is transmitted as discussed later herein.

The dotting sequence signal is a series of one and zeros that are provided for enabling the handset unit, and also the base unit as later shown herein, to align the phase of its receive clock with the phase of the clock providing the incoming signal. When the phase of these clocks is aligned, the handset unit is then able to read in the proper bit boundary the security code and barker code that follow the dotting sequence signal.

When attempting to contact the handset unit, the base unit sends 198 bits of the dotting sequence signal followed by the security code. This security code is a 16 bits random number generated by the base unit and, as earlier indicated, is transferred to the control unit 210 in the handset unit 20 over the battery charge contacts while the handset unit is in the cradle of the base unit 10. This shared security code guards against another base unit inadvertently synchronizing with this handset unit. Also, during ongoing communications, the base unit and handset unit are able to determine if any channel, over which they are then communicating, is being interfered with by assessing the number of security code bits that are received incorrectly while on this channel.

The security code is followed in the initialization synchronization pattern by the barker code. This barker code is a fixed predetermined eight-bit pattern which provides a position reference in a frame for aligning a frame clock of the receiver in the handset unit with the frame clock of the transmitter in the base unit. This permits the handset unit to re-establish frame sync or frame phase with the base unit after the handset unit has been turned off during its low power monitoring mode of operation. When aligning with the handset unit, a frame clock in the receiver of the base unit must similarly be aligned with a frame clock of the transmitter in the handset unit.

After the base unit transmits the security code and barker code in the initialization sync pattern, no additional information is sent by the base unit in each frame for a time period equal to 30-bits. A delay is provided in this time period for certain internal processing to occur, including, for example, the reconfiguring of the frequency synthesizer 150 for receiving the initialization sync pattern from the handset unit.

Once the alignment of the frame position of the handset unit receiver with the base unit transmitter has been achieved, synchronization or "BIG SYNC" for the handset unit is established. Similarly, the alignment of the frame position of the base unit receiver with the handset unit transmitter also establishes BIG SYNC for the base unit.

Figure 2:
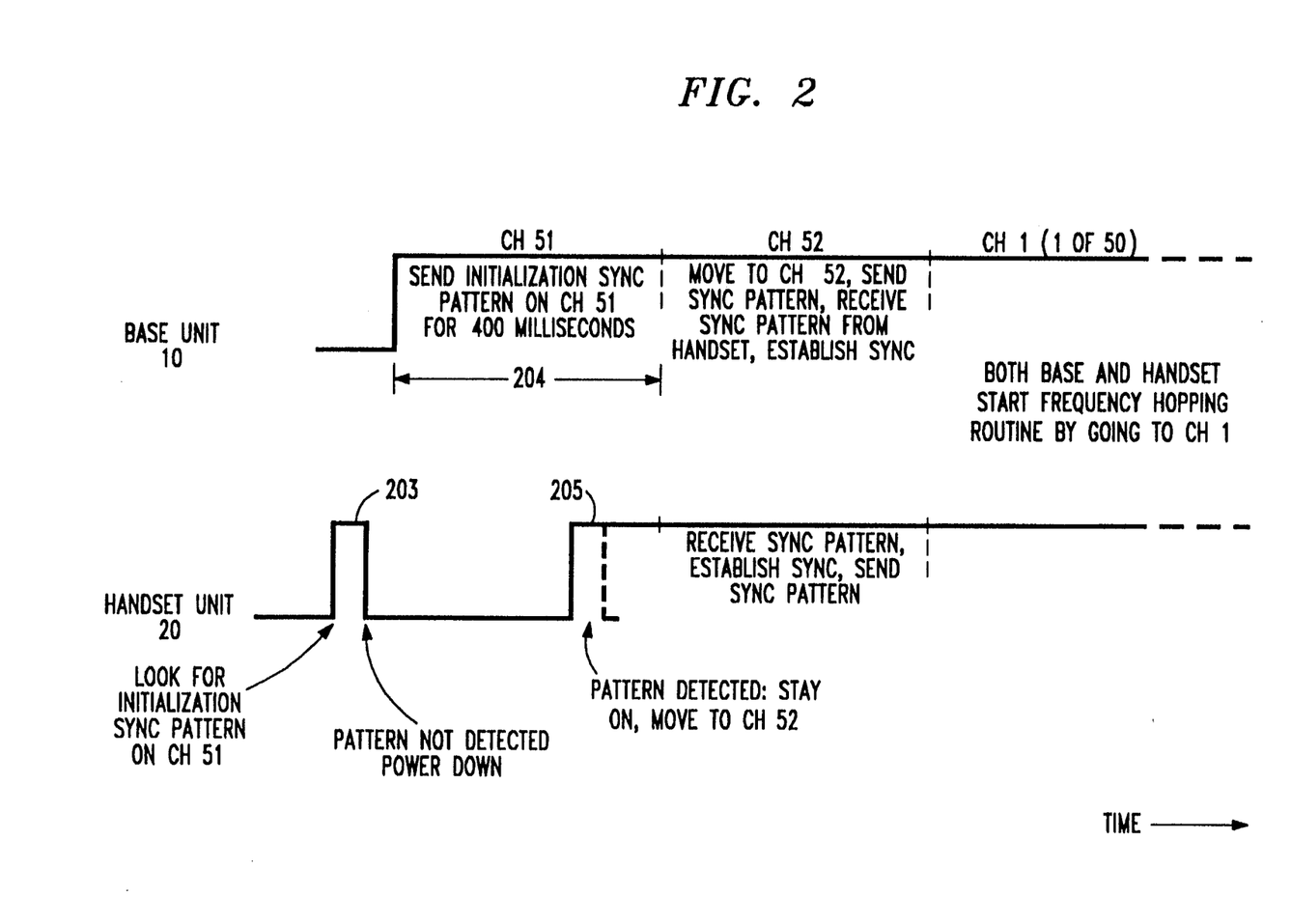
FIG. 2 is a timing diagram for illustrating the low power monitoring mode of the cordless telephone system in accordance with the invention.

Referring next to FIG. 2, there is shown the timing diagram for illustrating the operation of the cordless telephone system in providing a low power monitoring mode of operation for the handset unit. The general timing for transmission of a initialization sync pattern from the base unit 10 is shown in the upper portion of this figure and the timing for activation of the handset unit for receipt of this synchronization pattern is shown in the lower portion of this figure. The timing diagram also shows the interaction of the base unit in activating the handset unit to a full ON operating condition from the minimum power operating state.

Whenever the base unit desires to contact the handset unit, it sends the initialization sync pattern for time period 204 or 400 milliseconds as described earlier herein. As illustrated in the timing diagram, the handset receiver is initially in the off state then turned on for a time period 203 on channel 51 for approximately 40 milliseconds. At time period 203, the handset unit listens for the initialization sync pattern from the base unit 10 which is not detected. The handset unit is then powered down for 360 milliseconds. At the end of this 360 millisecond time period, the handset is turned on again at time period 205 and this time it does detect the initialization sync pattern being transmitted on channel 51 by the base unit 10. In order to insure that each transmitted sync pattern is detected, the length of the powered-down period for the handset unit receiver is designed such that the sync pattern will bridge across two powered-up periods.

In the 40 milliseconds that it is turned on, the handset unit will receive the sync pattern being transmitted from the base and thereby acquire BIG SYNC from the base unit on channel 51. Once the handset receives BIG SYNC, it moves immediately to channel 52 and waits for the base unit to also move to this channel and send the initialization sync pattern. Once the base unit transmits the initialization sync pattern on channel 51 for 400 milliseconds, it moves to channel 52 and continues sending this sync pattern on this channel. Since the handset unit has begun to monitor channel 52, the handset unit also will acquire BIG SYNC on this channel. Once BIG SYNC is acquired by the handset unit, it begins to transmit the initialization sync pattern back to the base unit on channel 52 so that the base unit also may align the phase clock for its receiver to the phase clock for the handset unit transmitter. The initialization sync pattern transmitted by the handset unit to the base unit in channel 52 is identical to that sent by the base unit to the handset unit in channels 51 and 52.

When the handset unit initiates the call to the base unit, the handset unit sends the initialization sync pattern to the base unit on channel 51 for approximately 120 milliseconds. After this period, it returns to its listening mode on channel 51. If the base received the sync pattern from the handset unit, the base takes over the call setup and the process described above is executed.

Figure 5:
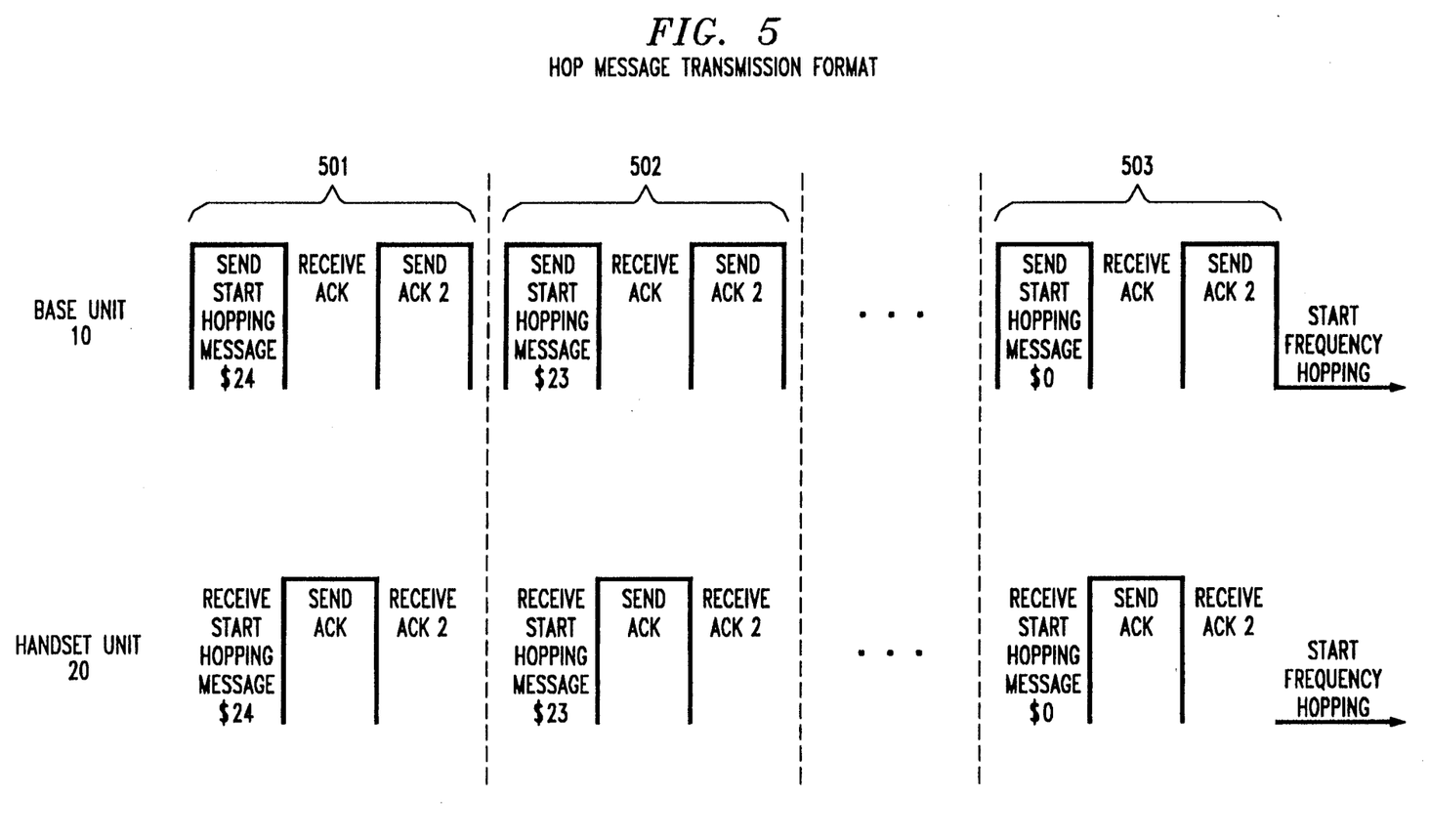
FIG. 5 shows a hop message transmission format suitable for incorporating into the cordless telephone of FIG. 1 in accordance with the invention.

During the time that the base unit and handset unit are on channel 52, these units must synchronize as to when to start the hopping sequence. Thus, once the base unit acquires BIG SYNC from the handset unit, it stops sending the initialization sync pattern, sends an 8-bit opcode to the handset unit informing it to stop sending the initialization sync pattern, and also starts sending the first in a series of opcodes defining when it and the handset unit are to begin frequency hopping. This message transmission format is shown in FIG. 5 and described later herein with reference to this figure.

Figure 3:
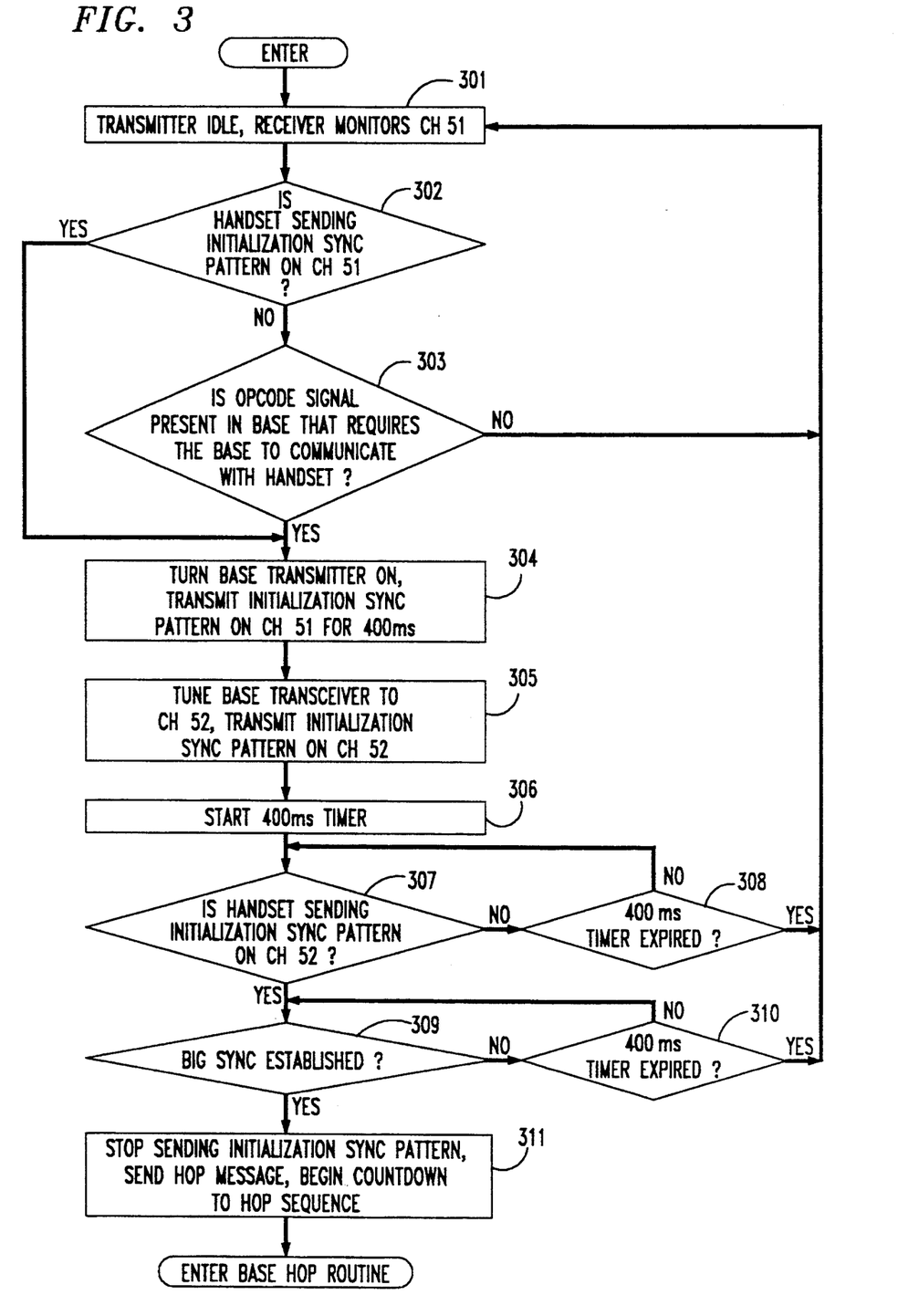
FIG. 3 is a flow diagram of a process suitable for incorporation into the base unit of the cordless telephone shown in FIG. 1 in accordance with the invention.

Referring next to FIG. 3, there is shown a flow chart illustrating the operation of the cordless telephone with the desired functionality including criterion for the base unit in initiating a call set-up with the handset unit. The functions provided by control unit 110 are advantageously determined by a process or program stored in mad only memory (not shown). The process is entered at step 301 where the transmitter in the base unit is idle and the receiver in the base unit is monitoring channel 51 for a signal from the handset unit. The process next advances to the decision 302 where it is determined if the handset unit is sending an initialization sync pattern on channel 51. If the handset unit is not sending this pattern on channel 51, the process advances to the decision 303 where a determination is made as to whether an opcode signal is present in the base unit that requires the base unit to communicate with the handset unit. Examples of such a signal would be an incoming ringing signal over the tip and ring lines and also a signal failure opcode described in greater detail later herein. If such a signal is not present, then the process return to step 301. This loop is repeated while the base unit is in the standby state monitoring channel 51 for a call from the handset unit.

When the handset unit is sending an initializing sync pattern on channel 51 as determined by decision 302, the process advances to step 304. Also when an opcode signal is present in the base unit that requires the base unit to communicate with the handset unit, the process similarly advances from decision 303 to step 304. At this step 304, the base unit transmitter is turned on and the initialization sync pattern is transmitted on channel 51 for 400 milliseconds. From step 304, the process advances to step 305 wherein the base transceiver (transmitter and receiver) is tuned to channel 52. The transmitter again transmits the initialization sync pattern on this channel and the receiver begins to monitor this channel for receipt of the initialization sync pattern expected to be provided by the handset unit on this channel.

From step 305, the process advances to step 306 where a 400 millisecond timer is started. The process then advances to decision 307 where a determination is made as to whether the handset unit is sending the initialization sync pattern as expected on channel 52. If this sync pattern is not being received, the process advances to the decision 308 where a determination is made as to whether the 400 millisecond timer has expired. If this timer has expired, the attempt to establish communications with the handset unit is terminated and the process returns to the step 301 where it again monitors channel 51. If the timer has not expired in decision 308, the process returns to decision 307 and continue to look for the initialization sync pattern on channel 52. If in decision 307, it is found that the handset unit is sending its initialization sync pattern on channel 52, the process advances to decision 309.

At decision 309, a determination is made as to whether BIG SYNC is established in the base unit. If not, the process advances to decision 310 where the 400 millisecond timer is examined once again. If this timer has expired, the process returns to step 301 and the call set-up attempt is discontinued. If the timer has not expired, the process returns to decision 309 and determines once again whether BIG SYNC has been established. When BIG SYNC is established, the process advances to step 311 where the base unit stops sending its initialization sync pattern, sends a message to the handset unit to cause it to also stop sending its sync pattern. The base unit also sends the hop message to the handset unit in this step and begins its countdown to the time at which the frequency hopping sequence is to start. Once the countdown sequence ends, the call setup routine is exited and the process enters the base hop routine.

Figure 4:
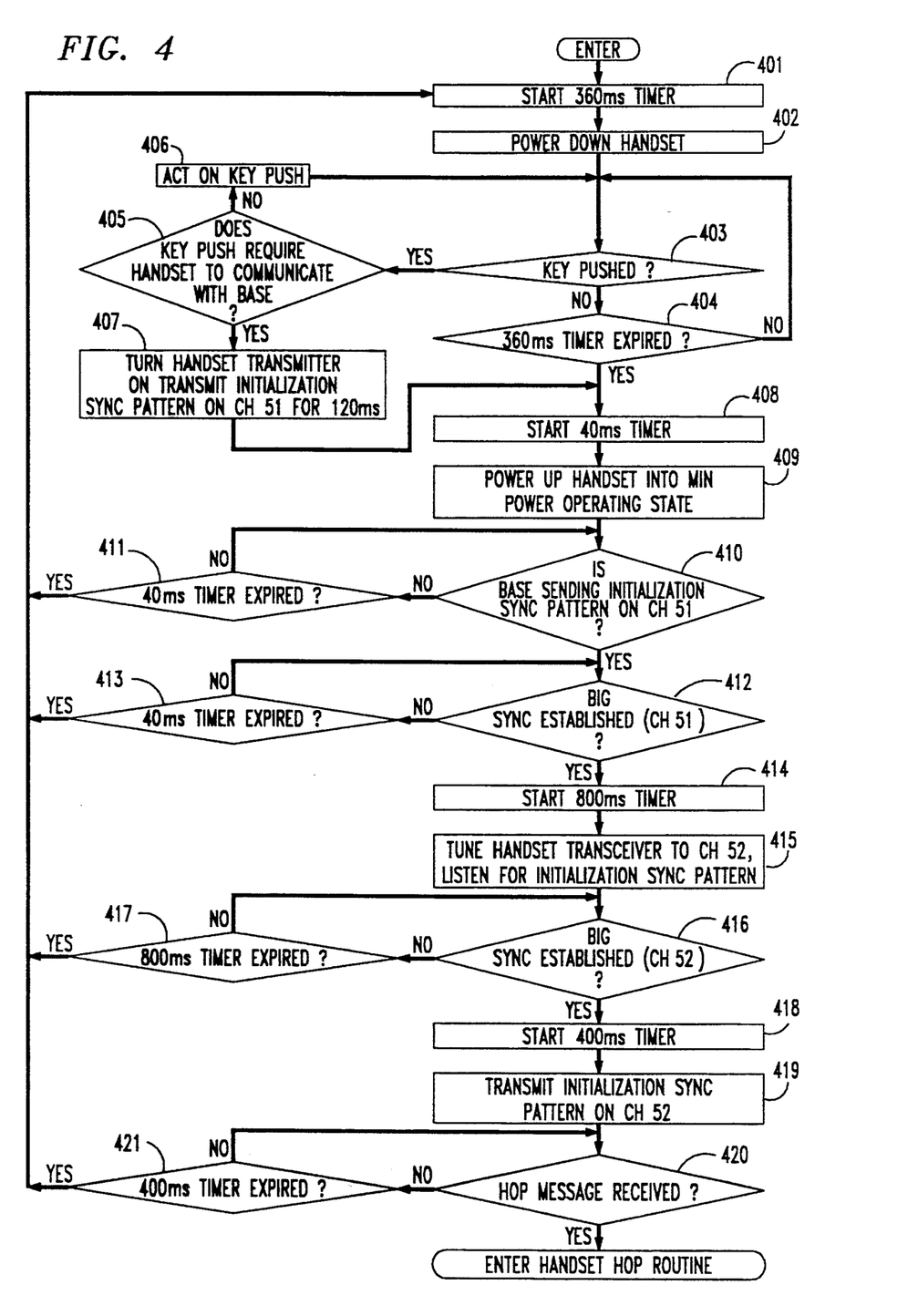
FIG. 4 is a flow diagram of a process suitable for incorporation into the handset unit of the cordless telephone shown in FIG. 1 in accordance with the invention.

Referring next to FIG. 4, them is shown a flow chart illustrating the operation of the cordless telephone with the desired functionality including criterion for operation of the handset unit in the low power monitoring mode. The functions provided by control unit 210 are advantageously determined by a process or program stored in read only memory (not shown). The low power monitoring mode is applicable when the handset unit is located remote from the base unit and not then communicating with the base unit. Certain circuitry in the handset unit is turned completely off while the handset unit is in this monitoring mode. Other circuitry in the handset unit is powered down and then back up as necessary for satisfactory operation.

The process is entered at step 401 where the wake-up timer, which expires or times-out in 360 milliseconds, is started. The process then advances to step 402 where all other nonessential circuitry in the handset unit is turned off. The process next advances to decision 403 where a determination is made as to whether a key on the handset unit keypad has been pushed. If not, the process advances to decision 404 where it determines whether the wake-up timer has expired. If this timer has not expired, the process returns to decision 403 and continues in this loop until either the timer expires or a key is pushed on the handset unit keypad.

If a key is determined to have been pushed in decision 403, specific circuitry in the handset unit, which monitors this function, determines in decision 405 whether the key push requires the handset unit to communicate with the base unit. If the key push does not require the handset unit to communicate with the base unit, the circuitry acts on the key push in step 406 and the process returns to decision 403 where it determines once again if a key has been pushed. If at decision 405, however, it is determined that the key push requires the handset unit to communicate with the base unit, the process advances to step 407 where the handset unit transmitter is turned on and the initialization sync pattern transmitted on channel 51 for 120 milliseconds. The process then advances to step 408 where a 40 millisecond timer is staged. The process similarly advances to this step 408 from decision 404 once it has been determined that the wake-up timer has expired.

From step 408, the process advances to step 409 where the handset unit is powered up into its minimum power operating state. In this state, the receiver and other minimum circuitry in the handset unit, necessary for determining if a RF signal is being transmitted by the base unit, are turned on. From step 409, the process advances to decision 410 where it is determined whether the base unit is sending the initialization sync pattern on channel 51. If not, the process advances to decision 411 where it is determined if the 40 millisecond timer has expired. If this timer has expired, the handset unit has not received the RF signal from the base unit and the process returns to the step 401. If the 40 millisecond timer has not expired, the process returns to the decision 410 and continues to look for the sync pattern on channel 51.

If the handset unit has determined in decision 410 that the base unit is sending the initialization sync pattern on channel 51, then the process advances to decision 412 where a determination is made as to whether the handset unit has acquired BIG SYNC on channel 51. If not, the process advances to decision 413 where it is determined if the 40 millisecond timer has expired. If this timer has expired, the handset unit has not received BIG SYNC in the allotted time from the base unit and the process returns to the step 401. If the 40 millisecond timer has not expired, the process returns to the decision 412 and continues to look for BIG SYNC on channel 51.

Once BIG SYNC is acquired on channel 51, as reflected in decision 412, the process advances to step 414 where an 800 millisecond timer is started. From this step, the process then advances to step 415 where the transceiver, i.e., the transmitter and the receiver, is tuned to channel 52 where the receiver begins to listen for the initialization sync pattern. From decision 415, the process advances to decision 416 where it is determined whether BIG SYNC has been acquired by the handset unit on channel 52. If not, the process advances to decision 417 where it is determined if the 800 millisecond timer has expired. If this timer has expired, the handset unit has not acquired BIG SYNC in the allotted time from the base unit and the process returns to the step 401. If the 800 millisecond timer has not expired, the process returns to the decision 416 and continues to look for BIG SYNC on channel 52.

If BIG SYNC is acquired on channel 52, the process advances from decision 416 to step 418 where a 400 millisecond timer is started. Next the process advances to step 419 where the transmitter in the handset unit begins to transmit its initialization sync pattern to the base unit on channel 52. The base unit will receive this initialization sync pattern from the handset unit, as earlier described herein with regard to the process in FIG. 3, and send a hop message to the handset unit.

From the step 419, the process advances to decision 420 where the handset unit determines whether the hop message has arrived. If not, the process advances to decision 421 where it is determined if the 400 millisecond timer has expired. If this timer has expired, the handset unit has not received the hop message in the allotted time from the base unit and the process returns to the step 401. If the 400 millisecond timer has not expired, the process returns to the decision 420 and continues to look for the hop message. Once the hop message has been received, as reflected in decision 420, the handset unit begins its countdown sequence to the time at which the frequency hopping sequence is to start. When the countdown sequence ends, the routine for the low power monitoring mode is exited and the process enters the handset unit hop routine.

The desired functionality is provided to the cordless telephone, in accordance with the invention, through the processes of FIGS. 3 and 4 also in re-establishing an interrupted telephone call. The processes described in the flow diagrams of FIGS. 3 and 4 advantageously permit quick re-establishing of communications between the base unit and the handset unit should there be an inadvertent interruption of communications between these units. An interruption may occur in a number of ways. By way of example, as the user of the handset unit moves about, he or she could inadvertently wander outside the communication range of the cordless telephone while engaged in a conversation over the cordless telephone handset unit. The handset or base unit may shortly thereafter loose BIG SYNC. Also, certain channels over which the base unit and handset unit are assigned to hop among may become so noisy (either to the base unit, the handset unit or both of these units) such that communications may be affected when one or more of these channels are encountered. Thus, should the handset unit loose BIG SYNC with the base unit or the base unit loose BIG SYNC with the handset unit while communicating, the unit that first looses BIG SYNC will stop its frequency hopping and go to channel 51. The second unit, since it will no longer receive a signal from the first unit, will detect the absence of this signal and also immediately go to channel 51. Once the base unit arrives on channel 51, it immediately starts sending an initialization sync pattern to the handset unit in accordance with a signal failure opcode as is provided by the routine of FIG. 3, specifically decision 303. When the handset unit arrives on channel 51, it listens for this initialization sync pattern from the base unit. In accordance with the routines described in both FIG. 3 and FIG. 4, BIG SYNC is reacquired, the respective hop routines are entered, and communications is thereby re-established in the handset and base units.

Referring now to FIG. 5 there is shown the details of the hop message transmission format used for synchronizing the start of the frequency hopping sequence shared by both the handset unit and the base unit. Synchronization between the base unit and the handset unit is achieved by having the base unit select a specific number after which it and the handset unit must begin hopping. This number is also provide to the handset unit in a series of messages arranged in a count-down like sequence in groups of frames. In a first group of frames 501, the base unit sends a start hopping message or opcode, for example, hexadecimal 24 ($24) which is received by the handset unit. The handset unit then sends an acknowledge or "ACK" message back to the base unit acknowledging receipt of the start hopping message and this number. Next, the base unit sends and the handset unit receives an ACK 2 message for insuring that the correct start time has been receive by both the handset unit and the base unit for them to begin frequency hopping.

In a second group of frames 502, the base unit sends a start hopping message of, for example, hexadecimal 23 ($23) which is received by the handset unit. As with the first group of frames, the handset unit then sends an ACK message back to the base unit acknowledging receipt of this start hopping message. Similarly, the base unit sends and the handset unit receives an ACK 2 message for insuring that the correct start time for frequency hopping has been receive by both the handset unit and the base unit. For frame groups 501 and 502 and also subsequent frame groups, the base unit and the handset unit communicate this starting time through the series of start hopping messages so that the correct starting time is continually communicated to the control unit of both the handset unit and the base unit.

The start hopping messages are advantageously arranged in the frame groups such that they linearly decrease in value with each subsequent frame group transmitted between the base unit and the handset unit. Thus, if any one or more of the subsequent messages is not received by the handset unit or the base unit due to interference on a channel or otherwise, the control units in both the base unit and the handset unit, which are counting down to the start time, will still have the correct start time which is confirmed by the next correctly received message. When the hop message count reduces to hexadecimal zero ($0), as illustrated by frame group 503, the base unit and the handset unit both move to channel 1 and begin synchronously frequency hopping.

Various other modifications of this invention are contemplated and may obviously be resorted to by those skilled in the art without departing from the spirit and scope of the invention as hereinafter defined by the appended claims.

We claim:

1. An arrangement for providing communications between a base unit and a handset unit in a cordless telephone employed in a frequency hopping system, the base unit including a first transmitter and a first receiver and the handset unit including a second transmitter and a second receiver for respectively transmitting to the first receiver and receiving from the first transmitter in the base unit over any one of a plurality of communication channels, the arrangement comprising:

means for deactivating the second transmitter and the second receiver while the handset unit is located remote from the base unit and in a standby state;

means for selecting one from a plurality of available channels in a frequency hopping band for initiating communications between the base unit and the handset unit while the handset unit is in the standby state; and means for communicating a start time over the selected one of the plurality of channels for the base unit and the handset unit to begin a frequency hopping cycle, the start time communicating means including means for generating in the base unit a series of data messages and for providing these data messages to the handset unit, the handset unit comprising means for acknowledging receipt of the data messages, the data messages being indicative of the start time for the base unit and the handset unit to begin the frequency hopping cycle, the data messages linearly decreasing in value with time to a predetermined value at which the base unit and handset unit begin the frequency hopping cycle.

2. A method of initiating communications between a base unit and a handset unit of a cordless telephone employed in a frequency hopping system, the base unit including a first transmitter and a first receiver and the handset unit including a second transmitter and a second receiver for respectively transmitting to the first receiver and receiving from the first transmitter in the base unit over any one of a plurality of communication channels, the method comprising the steps of:

selecting one from a plurality of available channels in a frequency hopping band for initiating communications between the base unit and the handset unit;

configuring the second receiver for monitoring the selected one of the channels;

transmitting an initialization synchronization pattern by the base unit over the selected channel and receiving this pattern by the handset unit over the selected channel; and communicating a start time over the selected one of the plurality of available channels for the base unit and the handset unit to begin a frequency hopping cycle, the communicating step including the steps of generating a series of data messages by the base unit, transmitting the data messages to the handset unit, and acknowledging to the base unit receipt of the data messages by the handset unit, the data messages being arranged for linearly decreasing in value with time and decreasing to a predetermined value at which the handset unit and base unit begin the frequency hopping cycle.

3. The method of claim 2 wherein the channel selected from one of the plurality of available channels is one in a group of channels selected by a pseudo-random sequence.

4. An arrangement for providing communications between a base unit and a handset unit in a cordless telephone employed in a frequency hopping system, the base unit including a first transmitter and a first receiver and the handset unit including a second transmitter and a second receiver for respectively transmitting to the first receiver and receiving from the first transmitter in the base unit over any one of a plurality of communication channels, the arrangement comprising:

means for selecting one from a plurality of available channels in a frequency hopping band for initiating communications between the base unit and the handset unit;

means for configuring both the first receiver and the second receiver for monitoring the selected one of the channels; and means for communicating a start time over the selected one of the channels for the base unit and the handset unit to begin a frequency hopping cycle, the start time communicating means including means for generating in the base unit a series of data messages and for providing these data messages to the handset unit, the handset unit comprising means for acknowledging receipt of the data messages, the data messages being indicative of the start time for the base unit and the handset unit to begin the frequency hopping cycle, the data messages linearly decreasing in value with time to a predetermined value at which the base unit and handset unit begin the frequency hopping cycle.

5. The arrangement of claim 4 wherein the channel selected from one of the plurality of available channels is one in a group of channels selected by a pseudo-random sequence.

6. The arrangement of claim 5 wherein the group of channels includes a first set of channels for initiating communications and a second set of channels for maintaining ongoing communications between the handset unit and the base unit.

7. In a cordless telephone, a handset unit arranged for communicating with a base unit in a frequency hopping system, the handset unit including a first transmitter and a first receiver for respectively transmitting to a second receiver and receiving from a second transmitter in the base unit over any one of a plurality of communication channels, the handset unit comprising:

means for selecting one from a plurality of available channels in a frequency hopping band for initiating communications with the base unit means for configuring the first receiver for monitoring the selected one of the channels; and means for receiving a series of data messages from the base unit, the data messages being indicative of the start time for the base unit and the handset unit to begin the frequency hopping cycle, the data messages linearly decreasing in value with time to a predetermined value at which the base unit and handset unit begin the frequency hopping cycle.

8. The handset unit of claim 7 wherein the channel selected from the plurality of available channels is one in a group of channels selected by a pseudo-random sequence.

9. The handset unit of claim 8 wherein the group of channels includes a first set of channels for initiating communications with the base unit and a second set of channels for maintaining ongoing communications with the base unit.

10. In a cordless telephone, a base unit arranged for communicating with a handset unit in a frequency hopping system, the base unit including a first transmitter and a first receiver for respectively transmitting to a second receiver and receiving from a second transmitter in the handset unit over any one of a plurality of communication channels, the base unit comprising:

> means for selecting one from a plurality of available channels in a frequency hopping band for initiating communications with the handset unit;
>
> means for communicating a start time over the selected one of the plurality of channels for the base unit and the handset unit to begin a frequency hopping cycle; and
>
> means for generating a series of data messages and for providing these data messages to the handset unit, the data messages being indicative of the start time for the base unit and the handset unit to begin the frequency hopping cycle, the data messages linearly decreasing in value with time to a predetermined value at which the base unit and handset unit begin the frequency hopping cycle.

11. The base unit of claim 10 wherein the channel selected from the plurality of available channels is one in a group of channels selected by a pseudo-random sequence.

12. A method of communicating for a cordless telephone having a base unit and a handset unit employed in a frequency hopping system, the base unit including a first transmitter and a first receiver and the handset unit including a second transmitter and a second receiver for respectively transmitting to the first receiver and receiving from the first transmitter in the base unit over any one of a plurality of communication channels, the method comprising the steps of:

> selecting any one from a plurality of available channels in a frequency hopping band for initializing the handset unit and base unit on said selected channel while the handset unit is mated with the base unit, the selected channel being used for initiating communications between the base unit and the handset unit while the handset unit is located remote from the base unit and in a standby state;
>
> configuring both the first receiver and the second receiver while the handset unit is mated with the base unit, the first receiver and the second receiver monitoring the selected one of the channels while the handset unit is in the standby state;
>
> deactivating the second transmitter and reducing the on-time state of the second receiver while the handset unit is located remote from the base unit and is in the standby state; and
>
> transmitting an initialization synchronization pattern by the base unit over the selected channel and receiving this initialization synchronization pattern by the handset unit over the selected channel while the handset unit is located remote from the base unit, the initialization synchronization pattern including phase aligning signals and a security code signal, said phase aligning signals including a dotting sequence signal and a barker code signal for synchronizing the second receiver with the first transmitter.

13. The method of claim 12 wherein the channel selected from one of the plurality of available channels is one in a group of channels selected by a pseudo-random sequence.

14. The method of claim 13 wherein the group of channels includes a first set of channels for initiating communications and a second set of channels for maintaining ongoing communications between the handset unit and the base unit.

15. The method of claim 14 wherein the channel selected from one of the plurality of available channels for initiating communications comprises the first selected one of the first set of channels.

* * * * *